United States Patent [19]
Johansson et al.

[11] 3,943,650
[45] Mar. 16, 1976

[54] FISHING DEVICE

[76] Inventors: Ingemar Johansson; Bjarne Reinertsen, both of Skiftesgatan 2, Goteborg, Sweden, 41706

[22] Filed: Dec. 10, 1974

[21] Appl. No.: 531,336

[30] Foreign Application Priority Data
Dec. 20, 1973  Sweden.............................. 73171720

[52] U.S. Cl. ................................................ 43/15
[51] Int. Cl.² ........................................ A01K 97/00
[58] Field of Search .......................................... 43/15

[56] References Cited
UNITED STATES PATENTS

| | | | |
|---|---|---|---|
| 2,177,912 | 10/1939 | Spitz et al. | 43/15 |
| 2,799,111 | 7/1957 | Voboril | 43/15 |
| 2,810,981 | 10/1957 | Littau | 43/16 |
| 2,851,812 | 9/1958 | Beck | 43/15 |
| 2,984,039 | 5/1961 | Willey | 43/15 |
| 3,867,779 | 2/1975 | McMaster | 43/15 |

*Primary Examiner*—Hugh R. Chamblee
*Assistant Examiner*—Daniel J. Leach
*Attorney, Agent, or Firm*—Holman & Stern

[57] ABSTRACT

An improved device for holding the tip of a resilient fishing rod in a bowed position when the fishing line is baited and for releasing the tip for sudden snap movement upwardly when a force is exerted on the fishing line by a fish. The device is provided with a trip means having an adjustable member for setting the force required for initiating the snap movement. The adjustable member is arranged for infinitely variable displacement along the outer fish rod end, and in the bowed position, the adjustable member coacts with a hook member attached to one end of a line, with the other end of the line being attached to the fishing rod at a position remote from the tip. For obtaining the desired bowed position or bending of the fishing rod tip, the hook member is releasably attached to a support member on the tip. The adjustable member is arranged between the extreme end of the rod and the support member. The adjustable member for setting the force required for releasing the tip for snap movement provides a useful means for adjusting the force in relation to the weight of the bait. An adjustment can be carried out even when the line is baited and fishing is carried out.

12 Claims, 9 Drawing Figures

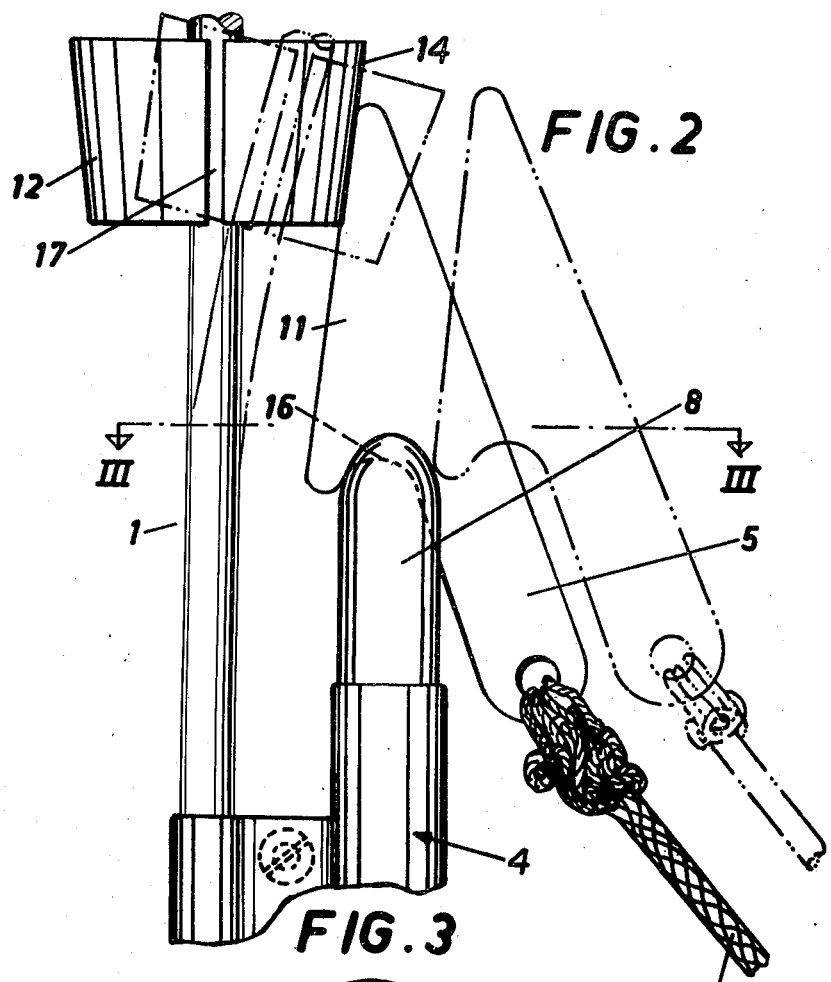
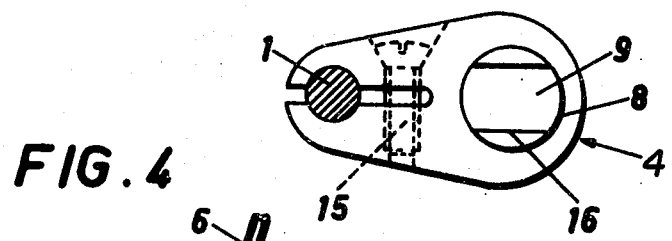
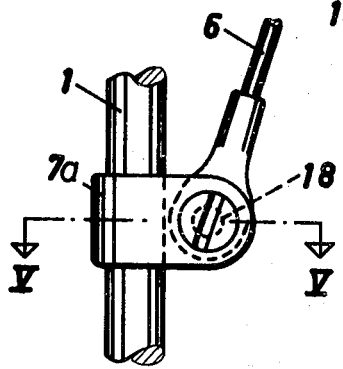
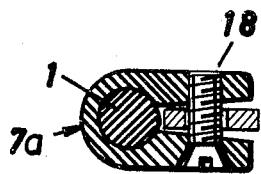

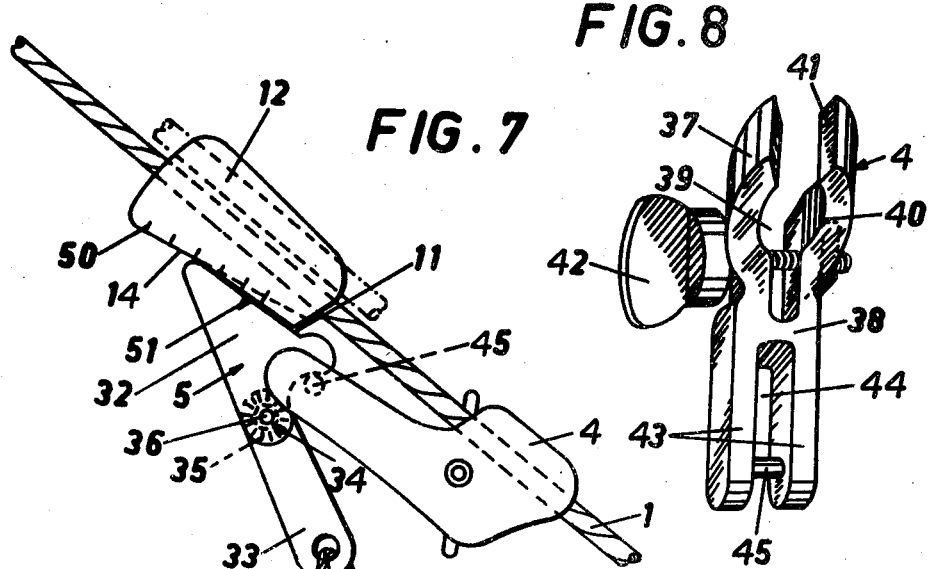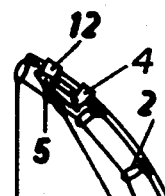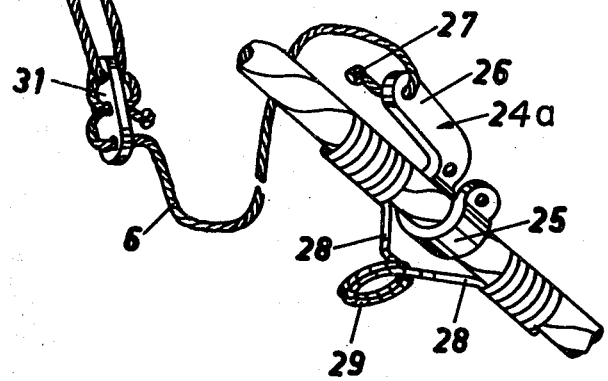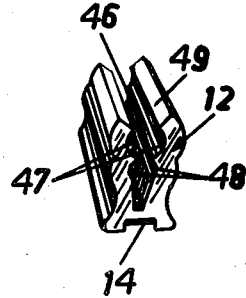

FISHING DEVICE

BACKGROUND OF THE INVENTION AND DESCRIPTION OF PRIOR ART

The invention relates to a device for setting the resilient tip of a fishing rod in a bowed, tensioned and releasable fish catching state.

Fishing devices settable in such a tensioned state and in which a slight pulling force exerted in the fishing line releases the device for giving a sudden upwardly directed pulling force in the line are previously known. For instance, U.S. Pat. No. 2,177,912 discloses a fishing device in which the outer end of a fishing rod can be brought to a tensioned, bowed position by means of a rod means attached to a support member for the fishing rod and releasably attachable to the outer end of the fishing rod. For holding the fishing rod in a bowed position, there is arranged a hook at the free end of the rod means, which hook cooperates with a ring at the free end of the fishing rod. The fishing line passes through a forklike member at the top of the rod means and is gripped between the fingers of the fork. When a force is exerted in the fishing line at the end thereof, the line will first pull the rod means out of the loop at the top of the fishing rod and then the fishing rod will snap back to its untensioned state. The only way of varying the force required for snapping back the fishing rod to its original untensioned state, is to alter the position of the inner end of the fishing rod in the fishing rod support member.

In Swedish Pat. No. 84,608, there is disclosed a different type of device for obtaining a sudden upwardly directed pulling force when a slight force is exerted on the free end of a fishing line. For obtaining this, at the free end of a fishing rod, there is arranged a pivotally connected arm which has a roller at the free end thereof. Integral with said arm a hook is formed and can be engaged with a spring biased arm at the top of the fishing rod end. A further roller is arranged on said spring biased arm, and when the hook has been brought into engagement with the spring biased arm, the fishing line is passed over said two rollers. A force exerted on the free end of the fishing line will pull the arm having the hook out of engagement with the spring biased arm, and the fishing line will suddenly be pulled upwardly when the spring biased arm returns to its original position.

There have been proposed a number of devices having tripping means for snapping a bowed, resilient fishing rod end back to its original untensioned position but all of these known devices have suffered from the drawback that it has not been possible to provide any easy adjustable means for varying the force required for relasing the tripping means and snapping the fishing rod end back to its original position.

SUMMARY OF THE INVENTION

The main object of the invention is to provide an improved device for making possible the adjustment of the force required for snapping back a bowed, resilient fishing rod tip.

Another object of the invention is to provide a device which easily can be mounted on different types of existing fishing rods.

A further object of the invention is to provide a simple and reliable tripping device, the releasing force of which easily can be adjusted during fishing and also being adjustable within a broad load range, from the heaviest to the slightest baits.

The improved device, according to the invention, comprises at the tip of a resilient fishing rod, a support means for a hook member attached to one end of a second line, means for attaching the other end of the second line to the fishing rod at a position remote from the tip with the distance between said support means and said attaching means and the length of the second line being such that when the hook is supported in said support member, the fishing rod is bowed against the spring force of the rod; means on said hook member for providing a contact surface; and an adjustable means arranged on the fishing rod end between the extreme end thereof and said support means and displacable along the fishing rod tip and having a tripping surface for engagement with the contact surface of said hook, the arrangement being such that when the tip of the fishing rod is bent further, the tripping surface of the adjustable means presses the hook means out of engagement with the support means, and the rod end tip is released.

BRIEF DESCRIPTION OF THE DRAWINGS

For further explaining the invention and the advantages and features thereof, the invention will now be described with reference to the enclosed drawings.

FIG. 2 is an enlarged partial view of a modified embodiment of the device according to FIG. 1, FIG. 3 is a section along lines III — III in FIG. 2, with the hook being removed for clarifying the construction of the support means, FIG. 4 is an elevational side view of a member for attaching to the fishing rod the line used for bowing the fishing rod, FIG. 5 is a section on line V — V in FIG. 4, FIG. 6 schematically shows a spinning rod mounted to the gunwale of a boat and having a device according to a second embodiment of the invention mounted thereon, FIG. 7 is a detailed view showing the different elements of the device used in the embodiment according to FIG. 6, FIG. 8 is a perspective view showing the hook support member in FIG. 7, and FIG. 9 is a perspective view showing the displaceable member in FIG. 7.

DETAILED DESCRIPTION OF PREFERRED EMBODIMENTS

Figure 1:
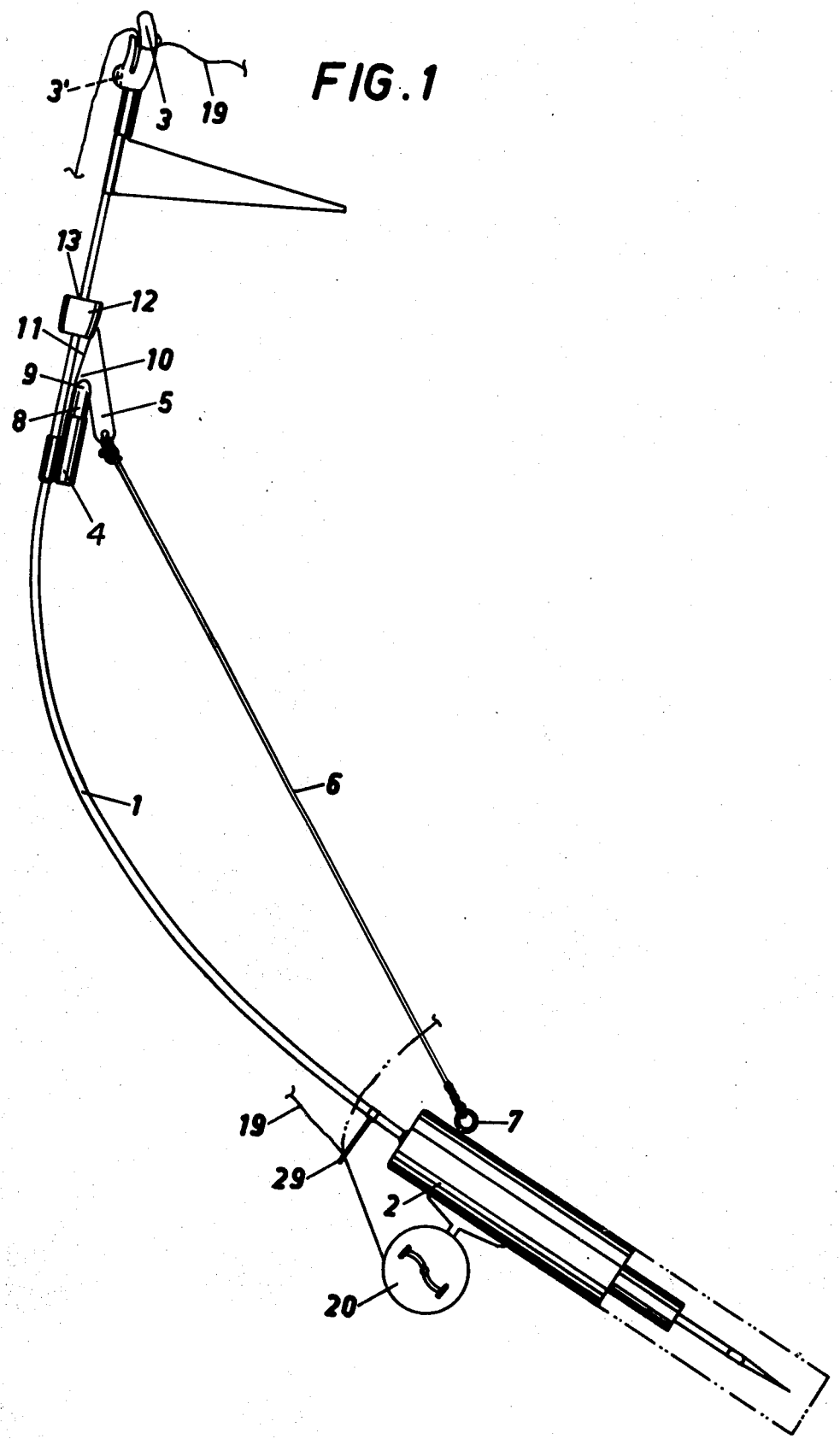
FIG. 1 is a fishing rod having a device according to one embodiment of the invention, with the device being shown in a position in which the fishing rod is ready for fishing.

The fishing instrument according to FIG. 1 comprises a rod 1 having a handle 2 and a fishing line supporting member 3 at the tip of the rod. The rod 1 is manufactured of a resilient material, for instance, reinforced fiber glass.

The fishing line support member 3 is a nose shaped member having a bow-shaped slot in the direction of the rod 1, is also provided with a hole 3' at a rear portion thereof. In the bowed position in FIG. 1, a fishing line 19 is supported by the member 3 by forming a loop in the line and inserting the nose shaped portion of the member 3 in said loop as schematically disclosed in FIG. 1. The fishing line is broken in FIG. 1, but it is to be understood that at the rear end thereof, the line extends to a reel 20 mounted at the handle 2. The other end of the line 19 is, of course, immersed in water and provided with a bait. The arrangement of the fishing line 19 in FIG. 1 is particularly suitable when great forces are expected on the line. Alternatively, the fishing line 19 can be attached in the hole 3' of the nose shaped member 3, in which case no reel is needed.

In FIG. 1, the device for bowing the tip of the fishing rod 1 comprises a support member 4, a hook member 5 releasably attachable to said support member, with the hook 5 being attached to a second line 6 which, at the other end thereof, is fixed to a ring shaped member 7 screwed into the handle 2 of the fishing rod.

A portion 8 of the support member 4 coacting with the hook member 5 comprises a pin having a rounded end portion 9 complementarily shaped to a rounded shoulder or hook shaped surface 10 of the hook member 5.

As is disclosed in FIG. 1, the length of the second line 6 is such that the hook member 5 can be attached to the supporting member 4 only when the fishing rod is bowed. The hook member 5 has a contact surface 11, with the contact surface being spaced from the rod 1 when the rod is in the bowed position and when the hook is attached to the support member 4. When a force is exerted on the fishing line 19 supported by the nose shaped member 3, the tip of the fishing rod supporting an adjustable member 12 will be bowed towards the contact surface 11 of the hook member, and if the load or pulling force on the fishing line is sufficient, the adjustable member 12 will press against the contact surface 11 and force the hook out of engagement with the pin 8 of the support member 4. Under the influence of its inherent spring force, the resilient rod resumes its original, straight position, and a strong pulling force will be exerted on the line 19 hanging on the member 3. When the line 19 is suddenly pulled upwards, the fish will be hooked. If later on, the fish pulls heavily on the line 19, the line will be released from the nose shaped member 3, and thereafter the line will be supported by a ring 29 close to the handle 2 of the rod.

For setting the releasing force, i.e., the load required for releasing the tripping device and bringing the rod 1 back to its original state, the member 12 is displaceable along the rod end. The member 12 has a central hole 13, and as disclosed in FIG. 2, the member 12 is divided by a slot 17 along the entire length of the member and leading to the hole 13 (FIG. 1). Thus, the slotted hole 13 will accommodate the increasing or decreasing width of the fishing rod tip when the member 12 is displaced along said tip. The member 12 is approximately shaped as a truncated cone having its small end arranged towards the support member 4. The member 12 will, therefore, have an external surface 14 converging towards the support member 4. When the member 12 is displaced towards the support member and the hook member 5 supported thereon, the surface 14 of the member 12 will engage the contact surface 11 of the hook member. By displacing the member 12 closer to the support member 4, the hook member 5 will be turned around the rounded portion 9 of the pin 8 and the grip between the hook shaped shoulder 10 and the pin 8 will be made smaller which also means that the required releasing force will be less.

In the embodiment according to FIG. 2, the support member 4 is detachable from the fishing rod and can be displaced to different positions for being fixed in said positions. For obtaining this end, the portion of the support member gripping around the rod is slotted and provided with a fixing screw 15.

For obtaining reliable attachment of the hook to the pin 8 at the rounded portion of the pin, there may be formed a groove 16 in the top portion of the pin 8, with said groove having a width greater than the thickness of the hook member 5. By this groove, the hook member is guided laterally so that the hook member cannot be released from the support member due to, for instance, vibrations or the like.

There is also another purpose of having the adjusting member and the support member detachable. By such an arrangement, said members can be attached to existing fishing rods provided with fixed fishing line rings which prevent mounting of said members from the outer free end of the rod. As appears from FIGS. 4 and 5, a line attaching member 7a is also detachable from the rod 1. The member 7a is slotted to the interior space thereof, and the external end of the slot can be shaped with a diverging entrance opening. The member 7a has a U-shaped cross section, and the two legs of the U can be brought towards each other by means of a screw 18 so that the required grip around the rod is obtained. The screw 18 also serves as support for the second line 6.

In FIG. 6, the fishing rod is an ordinary one hand spinning rod which is supported in a support member 21 attached to a gunwale 22 of a boat 23. The fishing line 19 is fed through ordinary rings 24 of the fishing rod. In the baited position, the rod 1 is held in a bowed position by means of the second line 6 fixedly attached to the lower portion of the rod and releasably attached to the tip of the rod by means of a tripping device according to a further embodiment of the invention.

The tripping device used on the spinning rod in FIG. 6 is shown more in detail in FIG. 7. As far as possible, the same reference numerals have been used in FIG. 7 as in the previous embodiment of the tripping device. At the end of the line second 6 remote from the hook shaped member 5, there is arranged an attachment member 24a. The member 24a comprises a U-shaped main portion 25 and an integrally formed mounting portion 26 having a hole through the line 6 is passed. A knot 27 is formed at the end of the line 6 so that the member 24a will be retained on the second line. For attachment of the second line 6 to the fishing rod, the member 24a is inserted between legs 28 of an ordinary ring 29a provided on the spinning rod.

At the other end of the second line 6, the hook shaped member 5 is attached by means of an ordinary member 31 for increasing and decreasing the effective length of the line 6. In the embodiment according to FIG. 7, the hook member 5 comprises two parts 32 and 33, and the mutual position between said members can be varied by means of a coupling 34. The coupling 34 is obtained by forming complementary shaped depressions and beads 35 in the members 32 and 33, respectively. The depressions and beads are arranged symmetrically around holes in the members 32 and 33. In FIG. 7, the member 32 has a hole 36 and there is a corresponding, aligned hole in the member 33. The members 32 and 33 are held together by means of a screw and nut arrangement (not shown). The particular design of the support member 4 in FIG. 7 is best disclosed in FIG. 8. The support member 4 comprises a main portion 37 having a substantially U-shaped cross section, and integral with said main portion is a hook supporting portion 38.

Similarly to the adjusting member 12 in FIGS. 1 and 2, the support member 4 in FIGS. 2 – 3 and the line attaching member in FIGS. 4 – 5, the support member 4 in FIG. 8 is formed on a resilient material, for instance, durable plastic material ("Delrin") or hard rubber. The main portion 37 has two arcuate portions 39 facing each other. In the interior of the main portion, a substantially cylindrical hole 40 for accommodating the rod is formed. In FIG. 8, the upper ends of arcuate portions 39 have side walls 41 diverging outwardly from the hole 40. By means of a wing nut screw 42 inserted through holes in the opposite walls of the main portion 37 at the bottom portion thereof, the dimensions of the hole 40 can be varied for accommodating fishing rods of different sizes. A threaded washer is preferably inserted in the main portion 37. The hook supporting portion 38 which is integrally formed with the main portion 37 comprises a base portion and two legs 43 extending from said base portion. The legs and the base portion of the hook supporting member portion 38 define an open space or slot 44. A pin 45, preferably rotatable and having a friction surface is inserted through the legs 43 and extends substantially parallel to the wing screw 42, and will, therefore, extend substantially perpendicularly to a plane containing the fishing rod 1 and the slot 44 in the mounted position. In the slot or space 44 between the legs 43, a nose portion 46 of the hook member 5 will be accommodated when the rod 1 has been bowed and the hook inserted in the support member.

In FIG. 9, the member 12 for adjusting the force required for resetting the rod to its original state is shown more in detail. As can be seen in FIG. 9, the rod 1 is inserted from above into a groove 46 in the member 12. The groove 46 can be formed to such a depth that the required strength of the member 12 is not adversely effected. In the groove 46, there are portions 47 and 48 having limiting surfaces facing each other for defining substantially cylindrical spaces within the groove 46. Similarly to the support member 4, upper side walls 49 of the groove 46 diverge from the interior of the slot.

As can be seen from FIG. 7, the adjusting member 12 and the hook member 5 cooperate in the same manner as the corresponding members in FIGS. 1 and 2, i.e., when the adjusting member 12 is displaced towards the support member 4 and when the tripping surface 14 thereof is in engagement with the contact surface 11 of the hook member 5, the hook member 5 is turned in a counter clockwise direction around the pin 45, and the force required for resetting the rod 1 to its original state when a force is exerted on the fishing line, will decrease in relation to the distance the member 12 is displaced towards the support member. In FIG. 7, identifications or marks 50, 51 have been formed on the adjustable member and the hook member, respectively. The identifications are used for establishing the releasing force required in different applications. By forming the tripping surface of the member 12 so that the distance between contact points of said surface and the rod 1 continuously increases when the member 12 is displaced towards the support member 4, the adjustment of the releasing force will be infinitely variable.

It is to be understood that variations in details and modifications of the preferred embodiments described in the specification and disclosed on the drawings are possible within the scope of the invention as it appears from the enclosed claims.

What we claim is:

1. In a fishing device of the type comprising a fishing rod having a resilient rod tip, a fishing line, means for supporting the fishing line at said tip and means for bowing said tip when said fishing line is baited, an improved tripping device for bringing the tip back to a straight position when a pulling force is exerted by a fish on said fishing line, said tripping device comprising means arranged on said tip for releasably supporting a member having a first hook shaped surface for engagement with said means and a second contact surface; a second line having opposite ends, means on said member for attaching said member to one end of said second line; means on said fishing rod at a position remote from said member for attaching the other end of said second line to the rod, the length of the second line being such that when the first hook shaped surface of said member is supported by the support means, the rod tip is in a tensioned, bowed position; and means displaceably arranged on the rod tip and having a tripping surface for engagement with said second contact surface of the member supported by the support means and for pushing said member away from the support means when a predetermined force is exerted on said fishing line and the displaceable means arranged on the rod tip is pressed against said second contact surface, the arrangement being such that for setting said predetermined force, the displaceable means is displaced for bringing the tripping surface thereof into engagement with the second contact surface of the member supported by the support means for placing the first hook shaped surface of said member in a predetermined position in said support means.

2. The fishing device according to claim 1, in which said displaceable means is arranged on the rod tip between said support means and one extreme end of the rod and comprises a body having a base, a top surface and an external substantially planar tripping surface inclined to at least one rod receiving passage extending between the base and the top surface of the body, the tripping surface being arranged for sloping in a direction towards an inner end of the rod; and in which the second contact surface of the member supported by said support means is a substantially planar surface facing the rod and arranged for placing the first hook shaped surface in said predetermined position when the tripping surface is brought into engagement therewith.

3. The fishing device according to claim 2, in which the support means has a slotted pin shaped end directed towards the free end of the fishing rod and substantially parallel thereto, with said slotted end being arranged for engagement with the first hook shaped surface of the member supported by said support means.

4. The fishing device according to claim 1 in which the displaceable means has a slot along the entire length thereof, with said slot leading to a rod receiving passage in said displaceable means.

5. The fishing device according to claim 1, in which said displaceable means comprises a body having substantially the shape of a truncated cone, the body having a base surface, a top surface, a central hole extending between the base and the top surfaces thereof, a slot along the entire length of the body parallel to said hole and extending from the exterior surface of the body into said hole, the base surface of the body being arranged for facing said support means; the second contact surface of the member releasably supported by said support means being a substantially planar surface facing the rod and forming an acute angle relative to said rod; and the support means having a slotted pin shaped end directed towards the free end of the fishing rod and substantially parallel thereto, said slotted end being arranged for engagement with the first hook shaped surface of the member supported by said support means.

6. The fishing device according to claim 5, in which a pin means is arranged in said slotted end for engagement with said first hook shaped surface.

7. In a spinning rod having a tip, a fishing line connected to the tip, a means for bowing the tip of the rod when the fishing line is baited, and a tripping device for bringing the tip back to a straight position, when a pulling force is exerted by a fish on said fishing line, the device comprising means attachable to a free end of the spinning rod for releasably supporting a member, said member having a first hook shaped surface for engagement with said means and a second contact surface facing the rod; a second line having opposite ends, means on said member for attaching said member to one end of the second line; means attached to the other end of the second line and provided with a hook member for locking said other end to the rod, the length of the line being such that when the first hook shaped surface of said member is supported by the support means, the rod tip is in a tensioned, bowed position; and means arranged for displaceable attachment on the rod tip and having a tripping surface for engagement with said second contact surface of the member supported by the support means and for pushing said member away from the support means when a predetermined force is exerted on said fishing line and the displaceable means mounted on the rod tip is pressed against said second contact surface, the arrangement being such that when the tripping device is mounted and the tip of the rod is bowed, said predetermined force is set by displacing said displaceable means relative to said support means so that said tripping surface, when brought into engagement with said contact surface of the member, positions the first hook shaped surface in a predetermined position in said support means.

8. The spinning rod according to claim 7 in which said displaceable means comprises a body having a base surface, a top surface, an external substantially planar tripping surface extending along a substantial length thereof and inclined to at least one passage extending between the base surface and the top surface of the body, the body having a mounting slot along the entire length of the body parallel to said passage and extending from the exterior surface of the body into said passage, the tripping surface being arranged for sloping in a direction towards the inner end of the rod in the mounted position; the second contact surface of the member supported by said support means being a substantially planar surface arranged for facing the rod in the mounted position; the support means having slotted end directed towards the free end of the rod and substantially parallel thereto; and a pin means is arranged in said slotted end for engagement with the first hook shaped surface of the member supported by said support means.

9. The spinning rod according to claim 8, in which identifications for establishing the predetermined force are formed on the exterior surface of the displaceable means at the second contact surface of the member supported by said support means.

10. The spinning rod according to claim 9 wherein the member supported by said support means substantially at the mid portion thereof is divided into two separate portions, and coupling means between said two portions for varying the mutual position of said portions.

11. The spinning rod according to claim 7 including a support member for supporting the inner end of the spinning rod at the a gunwale of a boat.

12. The spinning rod according to claim 7, wherein means are arranged for increasing and decreasing the effective length of the second line used for bowing the rod.

* * * * *